Sept. 19, 1967   E. J. WELLER ETAL   3,341,921
CUTTING INSERT
Filed Jan. 10, 1966
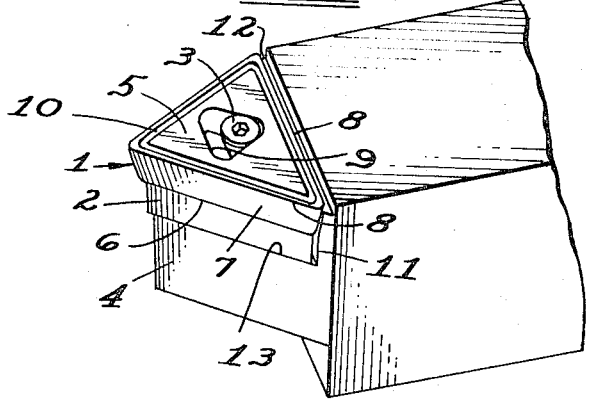
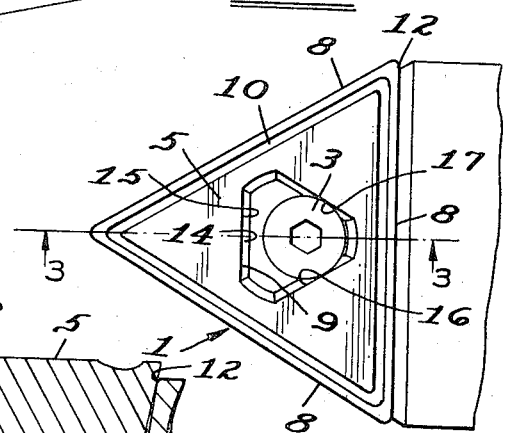
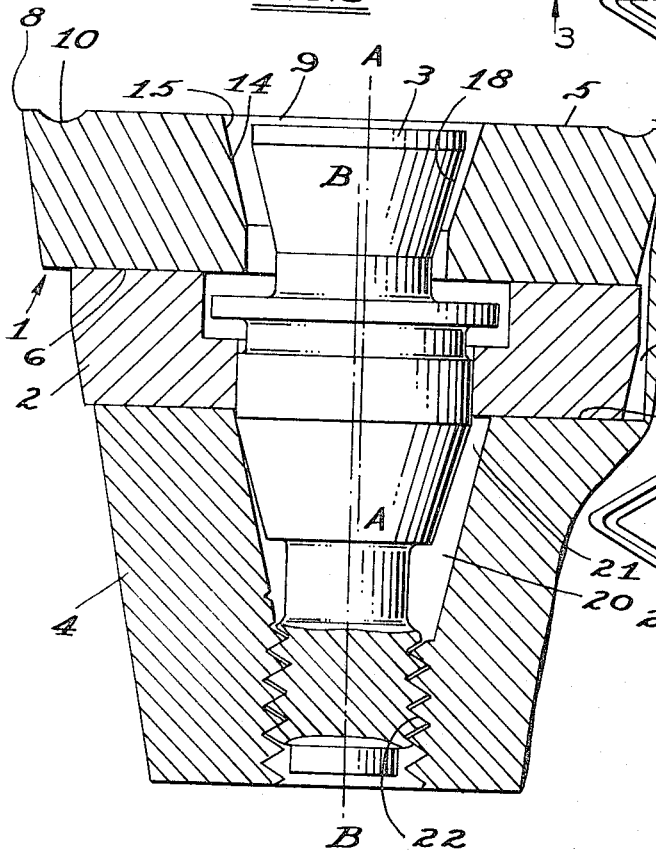
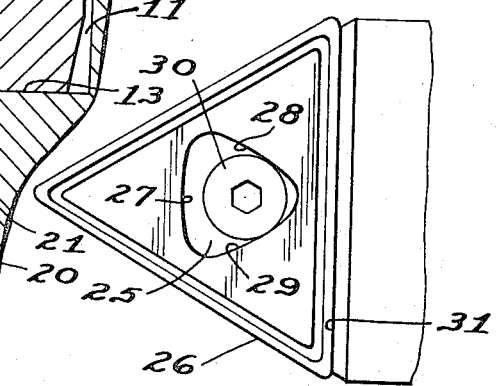
INVENTORS
ELBERT J. WELLER
WALTER H. KELM
BY Harold J. Holt
ATTORNEY

United States Patent Office 3,341,921
Patented Sept. 19, 1967

3,341,921
CUTTING INSERT
Elbert J. Weller, Detroit, and Walter H. Kelm, Mount Clemens, Mich., assignors to General Electric Company, a corporation of New York
Filed Jan. 10, 1966, Ser. No. 519,728
12 Claims. (Cl. 29—96)

ABSTRACT OF THE DISCLOSURE

A disposable cutting insert for a cutting tool having a non-cylindrical axial hole therein, the hole having a number of spaced-apart axial surfaces positioned in angular relationship to each other such that two adjacent of such surfaces together form a pocket which contacts spaced-apart surfaces of a locking pin for locking the insert in a holder. The insert design is particularly useful for inserts of the type used in positive-rake holders.

---

This invention relates to a disposable cutting insert of the type used in a cutting tool for the machining of metals and to a cutting tool provided with such insert.

Cutting tools having pin-type holding means for retaining disposable inserts have become increasingly more popular since their introduction in the last few years. In such cutting tools, a pin projects into a central hole in the insert and holds the insert against a shoulder of the shank of the tool holder. Pin-type tools possess a number of advantages over the older clamp-type toolholders in which an overhead- or bridge-type clamp holds a cutting insert in place. There are fewer operating parts in the pin-type holder, they present an unobstructed silhouette to the workpiece, and they permit quicker and easier indexing and replacement of inserts.

Such pin-type holding means, however, present a problem with respect to holding disposable inserts used in positive-rake cutting. Cutting inserts of the positive-rake type normally possess an angled peripheral surface or relief angle which creates a tendency for the insert to lift or to ride up the shoulder of the shank when subjected to the stresses of a machining operation or even when locking the insert in place.

One means for overcoming this problem in a pin-type holder is disclosed in the co-pending application of Walter H. Kelm, one of the co-inventors herein, S.N. 433,117 filed Feb. 16, 1965 and assigned to the same assignee as the present invention, the disclosure of which application is herein incorporated by reference. Positive inserts are there held in place against the tendency for vertical lift by use of a pin design which is tapered outwardly or flared at the top and which mates with a corresponding taper in the central hole of the insert, so that there is actually a downward force exerted against the insert when it is locked in position. While this design satisfies the lift or vertical movement problem, it results in less precise positioning of the insert. A flared pin requires a relatively large hole in the insert if the insert is to be permitted to be lifted from the pin for indexing or replacement. The diameter of the hole in the insert is considerably larger than the diameter of the pin which fits into that portion of the hole in the insert. As a result, there may be a difference as great as 0.025 inch in horizontally positioning the insert in the holder. In view of the very precise tolerances today required in the machining industry, a tolerance of this magnitude may in many instances be unacceptable.

It is an object of the present invention to provide a novel cutting insert which may be precisely positioned and securely held in a pin-type cutting toolholder. It is an additional object to provide a pin-type cutting tool utilizing such an insert. Other objects of the invention will become apparent from the disclosure which follows.

In general, the objects of the present invention are achieved by the provision of a cutting insert in which the axial hole, normally in the shape of a right cylinder, is modified so as to provide a dual rather than a single contacting surface for the pin to rest against to lock the insert in place. This is accomplished by providing at least one pocket in the hole in the insert having two opposite facing axial surfaces spaced apart by a distance less than the diameter of the locking pin. Two spaced-apart axial surfaces of the pin rest against the two spaced-apart surfaces of such pocket to lock the insert in place. By resting the pin against two separate surfaces of the insert rather than a single surface, very precise positioning of the insert is made possible.

The invention will be more clearly understood from the following description taken in conjunction with the accompanying drawing in which FIG. 1 is a perspective view of one embodiment of a cutting tool of the invention;

FIG. 2 is a plan view of the cutting tool shown in FIG. 1;

FIG. 3 is an enlarged cross-sectional view of the cutting tool head taken along the lines 3—3 of FIG. 2; and FIG. 4 is a plan view of a second embodiment of a cutting tool of the invention.

Referring to FIG. 1, the cutting tool comprises four principal parts—a cutting insert 1, a cutting insert seat 2, a retention pin 3, and a cutting took shank 4. The cutting insert is of the disposable- or throwaway-type having opposite-spaced parallel faces 5 and 6 and peripheral surface 7. A plurality of cutting edges 8 are provided in each face of the insert. The insert shown in the drawing is of the so-called positive-rake type in which peripheral surface 7 forms an acute angle (the relief angle) with the top parallel face 5 and an oblique angle with opposite parallel face 6. The axis of central hole 9 in the insert is perpendicular to each of the parallel faces. The top face 5 of the insert contains continuous chip-control groove 10. Cutting tool shank 4 contains a recess 11 at the head portion thereof to provide a supporting shoulder 12 and a base 13 for supporting insert 1 and seat 2.

As can be seen in FIGS. 2 and 3, central hole 9 in the insert is flared or tapered outwardly at 14 and has three flat surfaces 15, 16 and 17 in the tapered portion of the insert, forming essentially a triangle set 60 degrees out of phase with the triangle formed by the insert edges. The adjacent flat surfaces 16 and 17 together provide a pocket for reception of a locking pin 3. Locking pin 3 is also flared at 18 to provide a complementary taper to the insert. The angle of the taper 14 in the insert provides an effective angle in locking position greater than the relief angle of the insert to provide a vertical trap against lifting of the insert.

Locking pin 3 holds the insert and seat in place as follows: Pin 3 is threaded into a hole 20 in the recess 11 of the shank 4. The upper portion 21 of the hole in the recess is tapered inwardly from the base of the recess to form a conical portion having a central axis identified by the line A—A. The remaining threaded portion 22 of the hole in the recess of the shank is cylindrical and has a central axis B—B offset from the axis A—A in a direction away from the supporting shoulder 12 of the recess in the shank. The center line (not shown) of hole 9 in the insert is offset further from supporting shoulder 12 than either axis A—A or B—B so that the insert is pre-positioned closer to the pin for locking. As pin 3, which is symmetrical about a single axis, is threaded into the hole in the recess of the shank, a wedging or interfering contact with the conical portion of the hole in the shank will occur and as the pin moves axially into the holder, the insert will be tightened against the shoulder of the holder.

It will be noted from the drawing that the hole in the insert provides a "V-pocket" containing two angularly related spaced-apart axial surfaces for contacting the pin. The pin does not contact the rounded portion of the hole connecting two adjacent flat surfaces. It will additionally be noted that the number of flat surfaces contained in the hole equals the total number of insert indexes possible. Stated otherwise, the number of flat surfaces in the central hole will equal the number of sides on a polygonal insert. Thus, a triangular insert will have three flats and a square insert four. A circular insert will have a number of flats equal to the number of intended indexible positions.

The flats are positioned out of phase with respect to any cutting edge such that a line bisecting the included angle between any two adjacent flats will be normal to a cutting edge. Most disposable inserts are equilateral and thus in the inserts of the invention the polygon formed by extension of the flat surfaces of the central hole will also be equilateral and will have equal angles between adjacent flat surfaces. In most cases, the included angle between two adjacent flat surfaces of the central hole will be the same as the angle between any two adjacent peripheral sides of the insert.

The "V-pocket" design is also useful without a flared hole in the insert if precise positioning is desirable where insert lift is not a problem. If a flared design is utilized, the lower portion of the axial hole in the insert, i.e., the portion of reduced diameter, may be of the same configuration as the upper portion, as shown in the drawing. The shape of the lower portion of the hole is, however, largely a matter of insert manufacturing convenience. The terms "upper" and "lower" are used herein with reference to the normal position of the cutting tool as shown in the drawings. The term "axial" as used herein means along the axis of hole 9 in the insert and hole 20 in the shank. The tools may, of course, assume any position in a cutting or machining operation.

The inserts of the invention may possess other shapes than the "V-pocket" design of FIGS. 1–3, as long as dual surfaces are provided for support of the locking pin. One such alternate design is shown in FIG. 4 in which hole 25 of insert 26 is made up of three curved axial walls 27, 28 and 29. Two adjacent surfaces, as 28 and 29, form a pocket for reception of pin 30 for locking the insert against shoulder 31.

The present invention is particularly useful in the case of inserts of the so-called positive-rake type and has been described in connection with such inserts. However, the invention also has application to negative-rake inserts, i.e., inserts in which the peripheral surface is perpendicular to both the top and the lower faces, if there is a tendency for some reason for vertical movement or lift of the insert to occur during cutting, or if precise positioning of such inserts against a shoulder is important. A "V-pocket" design with or without a flared hole in the insert then becomes useful in negative rake cutting. It is not intended that the invention be limited except as set forth in the claims which follow.

What we claim as new and desire to secure by Letters Patent of the United States is:

1. A disposable cutting insert adapted to be releasably mounted in a toolholder, said cutting insert having a non-cylindrical axial hole therein tapered inwardly from an upper face thereof, said axial hole having at least two spaced-apart axial surfaces positioned in angular relationship to each other, two adjacent of said surfaces together forming a pocket adapted to support two spaced-apart surfaces of a locking pin for locking said insert in said toolholder, the bisection of the included angle between any two adjacent surfaces being substantially normal to a cutting edge on said insert.

2. The cutting insert of claim 1 in which the spaced-apart axial surfaces of the hole are flat.

3. The cutting insert of claim 1 having at least three spaced-apart axial surfaces in the hole.

4. The cutting insert of claim 1 which is polygonal in shape, the number of flat surfaces of the hole in the insert being equal to the number of sides of said polygonal insert.

5. A disposable, polygonally shaped cutting insert having upper and lower parallel faces, peripheral surfaces between said faces forming an acute angle with said upper face and an axial hole therein between said parallel faces, said axial hole having a plurality of flat surfaces equivalent in number to the number of sides of the polygonally shaped insert, said flat surfaces positioned in angular relationship to each other, the bisector of the angle of two adjacent of said flat surfaces being substantially normal to a cutting edge on said insert and together forming a pocket adapted to support two spaced-apart surfaces of a locking pin for locking said insert in a holder.

6. The insert of claim 5 in which the axial hole is tapered inwardly from said upper face.

7. A disposable cutting insert adapted to be releasably mounted in a toolholder, said cutting insert having a non-cylindrical axial hole therein, said hole having at least three curved converging surfaces, two adjacent of said three curved converging surfaces together forming a pocket adapted to receive a pin for locking the insert in the toolholder, said two adjacent converging surfaces adapted to contact two spaced-apart surfaces of the locking pin for locking said insert in said toolholder, said insert having at least three separate pockets for locking the insert in a toolholder at three separate indexable positions.

8. A cutting tool comprising
   a disposable cutting insert, said cutting insert having an axial hole therein providing at least one pocket adapted to receive a pin for locking the insert in the cutting tool, said pocket containing two opposite facing spaced-apart axial surfaces,
   a cutter body having a recess therein containing at least one supporting shoulder for the insert, cutter body having a hole therein extending into the cutter body from the recess,
   a locking pin circular in cross-section fitting within the hole in the cutter body with an end thereof projecting into the hole in the insert, said pin being adjustable in the direction of the shoulder against the two spaced-apart axial surfaces of the pocket in the hole of the insert to lock the insert in place against the shoulder of the cutter body, said pin and insert in locked position contacting each other at two separate spaced-apart portions thereof.

9. The cutting tool of claim 8 in which the insert has at least three pockets, each of which is adapted to receive a pin for locking the insert in the cutting tool.

10. The cutting tool of claim 8 in which the bisection of the included angle between any two adjacent spaced-apart axial surfaces of the hole in the insert is substantially normal to a cutting edge on the insert.

11. The cutting tool of claim 8 in which the cutting insert is of the positive-rake type having peripheral surfaces which form an acute angle with the upper face of the insert, and wherein the axial hole in the insert is tapered inwardly from the upper face.

12. A cutting tool comprising
  a disposable cutting insert, said cutting insert having an axial hole therein, said hole having at least two opposite facing spaced-apart flat axial surfaces positioned in angular relationship to each other,
  a shank having a recess therein containing at least one supporting shoulder for the insert, the shank having a hole therein extending axially into the shank from the recess,
  a locking pin circular in cross-section fitting within the hole in the shank with an end thereof projecting into the hole in the insert, said pin being adjustable in the direction of the shoulder against two adjacent of the spaced-apart flat surfaces in the hole in said insert to lock the insert in place against the shoulder of the shank, said pin and insert in locked position contacting each other at two separate spaced-apart portions thereof.

References Cited

UNITED STATES PATENTS

| | | | |
|---|---|---|---|
| 3,121,939 | 2/1964 | Williams | 29—96 |
| 3,137,059 | 6/1964 | Hertel | 29—96 |
| 3,299,489 | 1/1967 | Pohle | 29—96 |

FOREIGN PATENTS 1,126,701   3/1962   Germany.

HARRISON L. HINSON, *Primary Examiner.*